US010182558B2

(12) United States Patent
Humphrey (10) Patent No.: US 10,182,558 B2
(45) Date of Patent: Jan. 22, 2019

(54) METHOD, SYSTEM, AND HARVESTING APPARATUS FOR AQUACULTURE TRENCH MAINTENANCE AND HARVESTING

(71) Applicant: Robert Humphrey, Riverview, FL (US)

(72) Inventor: Robert Humphrey, Riverview, FL (US)

(73) Assignee: BAHAMAS CERTIFIED SEAFOOD, North Andros (BS)

( * ) Notice: Subject to any disclaimer, the term of this patent is extended or adjusted under 35 U.S.C. 154(b) by 233 days.

(21) Appl. No.: 14/969,824

(22) Filed: Dec. 15, 2015

(65) Prior Publication Data

US 2017/0164587 A1    Jun. 15, 2017

(51) Int. Cl.
*A01K 61/00*    (2017.01)

(52) U.S. Cl.
CPC ............ *A01K 61/00* (2013.01); *Y02A 40/81* (2018.01)

(58) Field of Classification Search
CPC ............................ A01K 61/00; Y02A 40/824
See application file for complete search history.

(56) References Cited

U.S. PATENT DOCUMENTS

| | | | | |
|---|---|---|---|---|
| 3,473,509 A | * | 10/1969 | Mitsutake | A01K 61/00 119/205 |
| 3,658,034 A | * | 4/1972 | Day | A01K 61/00 119/209 |
| 3,866,768 A | * | 2/1975 | Weir | B65G 67/08 198/510.1 |
| 3,916,832 A | * | 11/1975 | Sweeney | A01K 61/00 119/212 |
| 3,996,894 A | * | 12/1976 | Wiegardt, Jr. | A01K 61/54 119/237 |
| 4,213,421 A | * | 7/1980 | Droese | A01K 61/00 119/224 |
| 5,216,976 A | * | 6/1993 | Marinkovich | A01K 61/00 119/200 |

(Continued)

FOREIGN PATENT DOCUMENTS

| | | |
|---|---|---|
| CN | 104996348 A | 10/2015 |
| CN | 204742239 U | 11/2015 |

(Continued)

OTHER PUBLICATIONS

Notification of Transmittal of the International Search Report and the Written Opinion of the International Searching Authority (Forms PCT/ISA/220, PCT/ISA/210 and PCT/ISA/237) dated Mar. 6, 2017, by the Korean Intellectual Property Office in corresponding International Application No. PCT/US2016/060300. (17 pages).

*Primary Examiner* — Michael H Wang
(74) *Attorney, Agent, or Firm* — Buchanan Ingersoll & Rooney PC (57) ABSTRACT

A system of harvesting sea creatures from a trench holding the sea creatures in seawater, including a trench and a harvesting apparatus that extracts the sea creatures from the trench. The trench includes a gate at one end of the trench. The gate insertable into an opening at the end of the trench to prevent seawater from entering or exiting the trench and removable from the opening to allow the seawater to enter or exit the trench. The harvesting apparatus includes a conveyor that inclines. The conveyor includes a conveyor belt and a wedge at one end of the conveyor that contacts the bottom floor of the trench when the conveyor is inclined. The wedge directs the sea creatures onto the conveyor so that the sea creatures are conveyed by the conveyor belt out of the trench.

14 Claims, 3 Drawing Sheets

(56) References Cited

U.S. PATENT DOCUMENTS

| | | | | |
|---|---|---|---|---|
| 5,249,548 A | * | 10/1993 | Dupuy | A01K 63/00 119/243 |
| 5,472,293 A | * | 12/1995 | Roller | E02B 8/045 405/87 |
| 5,660,141 A | * | 8/1997 | Kjersem | A01K 61/00 119/223 |
| 6,041,738 A | * | 3/2000 | Hemauer | A01K 63/00 119/226 |
| 6,391,201 B1 | * | 5/2002 | Pelz | C02F 3/327 210/602 |
| 6,584,935 B2 | * | 7/2003 | Zohar | A01K 61/00 119/204 |
| 9,629,343 B1 | * | 4/2017 | Sallaberry | A01K 61/00 |
| 2003/0219311 A1 | * | 11/2003 | Hildstad | A01K 61/00 405/81 |
| 2004/0129619 A1 | * | 7/2004 | Leach | A01K 63/00 210/170.02 |
| 2012/0006277 A1 | * | 1/2012 | Troy | A01K 61/65 119/223 |
| 2015/0366173 A1 | * | 12/2015 | Myers | A01K 63/04 119/200 |

FOREIGN PATENT DOCUMENTS

| | | |
|---|---|---|
| KR | 20-0309605 Y1 | 4/2003 |
| KR | 10-0934461 B1 | 12/2009 |
| KR | 10-0974956 B1 | 8/2010 |

* cited by examiner

METHOD, SYSTEM, AND HARVESTING APPARATUS FOR AQUACULTURE TRENCH MAINTENANCE AND HARVESTING

FIELD

The present disclosure relates to a method of maintaining sea creatures in aquaculture trenches with sufficient seawater quality, a system of harvesting the sea creatures from the aquaculture trenches, and a harvesting apparatus for extracting the sea creatures from the aquaculture trench.

BACKGROUND

Aquaculture is the controlled farming of sea creatures, such as fish or crustaceans. Aquaculture is contrasted with harvesting wild sea creatures (e.g., commercial fishing or crabbing) because aquaculture involves cultivating the sea creatures in a controlled environment under controlled conditions. Aquaculture operations to grow and harvest sea creatures require significant efforts to maintain a seawater environment with appropriate water quality control, however, because of the changed ecosystem in the artificially created environment. For example, a large amount of sea creatures in a concentrated aquaculture environment can result in an increase of waste and other sea creature byproducts that cause water quality to deteriorate. Water quality control extremely important to ensuring the sea creatures, particularly in the early development stages, are able to survive and grow within the aquaculture environment.

Recirculating aquaculture systems address this water control quality issue by removing the water in the aquaculture environment, filtering the water, and recirculating the water into the aquaculture environment. However, the recirculating aquaculture systems require machinery (e.g., pumps and filters) to extract, filter, and then recirculate the water into the aquaculture environment. The recirculating system thus increases the cost and complexity of the aquaculture system operation. Furthermore, when the aquaculture environment is very large, such as large pools or irrigation ditches (e.g., several hundred feet around) for crustacean harvesting, the cost to circulate or recirculate the seawater becomes excessively high. Thus, a problem is presented in maintain the seawater environment within acceptable water quality control parameters without the excessive cost and complexity of recirculating aquaculture systems.

When an extended trench is used for cultivating crustaceans (e.g., Florida stone crab, *Menippe mercenaria*), another problem arises in extracting the crustaceans from the aquaculture system. There is not a known method or apparatus for efficient, automated or semi-automated removal of crustaceans or other sea creatures from the extended trench. Accordingly, there is a need for a harvesting apparatus that can effectively and efficiently extract sea creatures from an aquaculture trench.

SUMMARY

The present disclosure provides a description of methods, systems, and apparatuses for enhanced aquaculture trench water quality control and extraction of sea creatures from the aquaculture trench.

A method for circulating seawater in a trench occupied with sea creatures, the method including removing a gate from the trench when a seawater level is below a first tide level to create an opening in the trench; circulating the seawater into the trench through the opening when the seawater level rises above the first tide level; moving the gate to block the opening in the trench when the seawater level rises above a second tide level, the second tide level being higher than the first tide level; and releasing a portion of the seawater in the trench by removing the gate from the opening in the trench after the seawater level recedes to a lower tide level.

A system of harvesting sea creatures from a trench holding the sea creatures in seawater, the system including a trench extending in a longitudinal direction, the trench possessing a first end and a second end opposite to the first end in the longitudinal direction; and a harvesting apparatus configured to extract the sea creatures from the trench. The trench includes a first gate at the first end of the trench, the first gate being insertable to prevent the seawater from entering or exiting the trench and removable to allow the seawater to enter or exit the trench; and a second gate at the second end of the trench, the second gate being insertable to prevent the seawater from entering or exiting the trench and removable to allow the seawater to enter or exit the trench. The harvesting apparatus includes a conveyor configured to incline relative to walls of the trench, the conveyor comprising a conveyor belt; a wedge connected to the conveyor, the wedge configured to contact a bottom floor of the trench when the conveyor is inclined relative to the walls of the trench; and wherein the wedge is configured to direct the sea creatures onto the conveyor when the wedge contacts the bottom floor of the trench so that the sea creatures may be conveyed by the conveyor belt out of the trench.

A harvesting apparatus for extracting sea creatures from a trench extending in a longitudinal direction, including a main body configured to be positioned above the trench and extend in the longitudinal direction parallel to the trench; a rotatable conveyor connected to the main body, the rotatable conveyor possessing one end and an other end opposite to the one end, and the rotatable conveyor comprising a pivot at the one end, a wedge at the other end, and a conveyor belt. The rotatable conveyor is configured to rotate about the pivot so that the wedge at the other end contacts a bottom floor of the trench when the main body of the harvesting apparatus is positioned above the trench and extends in the longitudinal direction. The wedge possesses an inclined surface, and the wedge is positioned so that the inclined surface of the wedge is parallel to the conveyor belt when the wedge contacts the bottom floor of the trench. The inclined surface of the wedge is configured to contact the sea creatures to direct the sea creatures onto the conveyor belt of the rotatable conveyor.

BRIEF DESCRIPTION OF THE DRAWING FIGURES

The scope of the present disclosure is best understood from the following detailed description of exemplary embodiments when read in conjunction with the accompanying drawings. Included in the drawings are the following figures:

FIGS. 2A-2C are schematics illustrating an embodiment of a harvesting apparatus for removing sea creatures from the trench.

FIGS. 2D and 2E are schematics illustrating an embodiment of a wedge of the harvesting apparatus.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Method for Circulating Seawater Through a Trench

Figure 1:
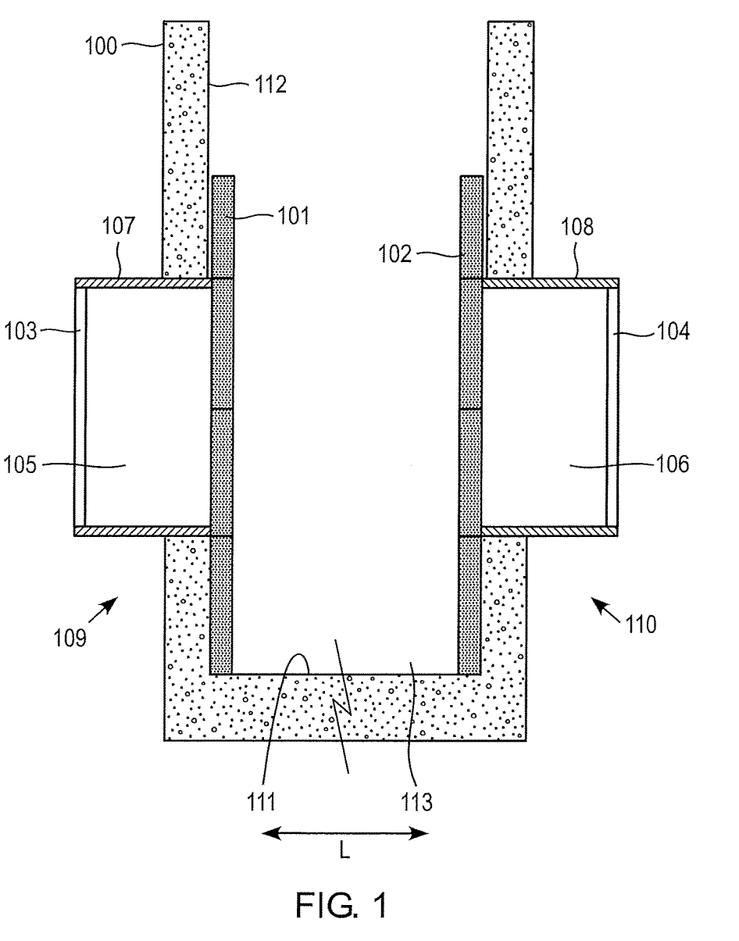
FIG. 1 is a schematic illustrating an elevation view of an embodiment of tidal aquaculture gates installed in a trench.

FIG. 1 illustrates a trench 100 for holding sea creatures in a seawater environment. The trench 100 may be an earthen trench dug between two bodies of water. The trench 100 may be cut into natural rock formations and/or formed with concrete or reinforced concrete walls. The natural rock formations (e.g., limestone) may also form the trench walls. Concrete walls can also be formed only on the inlet and exit faces of the trench 100.

The trench 100 may extend for a substantial length (e.g., hundreds or thousands of feet), but FIG. 1 shows an abbreviated view of the trench 100 so that each of the trench ends may be shown. In one embodiment, the trench is two feet wide and six feet deep, although it is envisioned that other dimensions can be used depending on equipment in forming the trench, topography, materials, creating optimal conditions for the sea creatures may be intuitively or experimentally determined and the dimensions of the harvesters. A system of trenches 100 may also be utilized to hold a much larger total volume of sea creatures than the volume of sea creatures that can be held in a single trench or a circular pond. For example, the system of trenches 100 may reach one hundred miles in total length. Each of the trenches 100 may be cut or formed to have an inlet side 109 and an outlet side 110. The description below is based on the inlet side 109 being on the left of FIG. 1, but that the outlet side 110 illustrated on the right of FIG. 1 could instead serve as the inlet side.

When the trench 100 has sea creatures within the trench 100, a need arises for circulating fresh seawater into the trench 100. To facilitate this seawater circulation, the trench 100 has two gates 101, 102 positioned at an inlet opening 105 and an outlet opening 106 at each end of the trench. These two gates 101, 102 are shown in a closed position to prevent any seawater from entering or exiting the trench 100 via the openings 105, 106. The gates 101, 102 may be made of any material that will prevent or control seawater from being introduced into the trench, such as stainless steel, steel, concrete, plastic, wood, or nearly any other material with sufficient strength and water resistance to hold back at least most of the water on one side of the gate.

In one embodiment, the openings 105, 106 of the trench 100 are circular openings. However, the openings 105, 106 may be any shape. In one specific embodiment, the openings 105, 106 are holes with a 24" diameter (i.e., a two foot diameter), but can be other shapes or even an open trench. The inlet opening 105 and the outlet opening 106 may be the same size and shape, but the inlet opening 105 and the outlet opening 106 could be shaped and/or sized differently from each other.

As shown in FIG. 1, the inlet opening 105 may be fitted with an inlet pipe 107 and the outlet opening 106 may be fitted with an outlet pipe 108. These pipes 107, 108 may extend outwardly from the trench 100 in the longitudinal direction "L" of the trench 100. The pipes 107, 108 may extend several feet or several hundred feet beyond the trench 100. The pipes 107, 108 may be each positioned so that the lower edge of the pipes 107, 108 is above the low tide elevation of the seawater (i.e., the seawater at low tide does not enter the pipes 107, 108. The pipes 107, 108 could alternatively not extend beyond the trench walls 112, but the pipes 107, 108 must be above the seawater outside of the trench 100 at low tide. The pipes 107, 108 may be positioned and sized to be equal, but opposite, to one another, but the pipes 107, 108 are not limited to being equally shaped and sized.

Circulating new seawater into the trench begins by removing the gates 101, 102 when the seawater level is at a first tide level. This first time level is at or below the lower edges of the inlet pipe 107 and the outlet pipe 108. The first tide level may be the low tide level of a particular day. Removing the gates 101, 102 may include manual removal or removal by an automated process, such as a machine or motor lifting the gates 101, 102 via chain(s) or the like. In an alternate embodiment, the gates 101, 102 could be valves (e.g., butterfly valves) that rotate to open. When this application uses the term "remove the gate", it is intended to mean that the gate 101, 102 does not block the opening 105, 106. In other words, in an embodiment where the gate 101, 102 is a butterfly valve that rotates open, the gate 101, 102 is "removed" from the opening 105, 106 when the gate 101, 102 no longer prevents seawater from being introduced into the trench 100. The gates 101, 102 may be plates, boards, butterfly valves, or any other configuration that can selectively open the openings 105, 106.

As the seawater level outside of the trench 100 rises above the first tide level (e.g., the low tide level), the seawater will begin to enter the inlet pipe 107. The seawater will then flow into the trench 100 through the inlet pipe 107 and will begin to circulate with the seawater in the trench 100. This circulation introduces fresh seawater into the trench 100. When the seawater level reaches a second tide level at or above the upper edge of the pipes 107, 108, the gates 101, 102 may be moved to block the openings 105, 106 to prevent the seawater from entering or exiting the trench 100. The second tide level may be the high tide level of a particular day. The second tide level is higher than the first tide level because the second tide level is at or above the upper edge of the pipes 107, 108.

When the gates 101, 102 are moved to block the openings 105, 106 of the trench, the trench 100 is completely filled with the seawater. The newly introduced seawater can circulate with the previously existing trench seawater when the gates 105, 106 are in the closed position (i.e., the gates have been moved to prevent the seawater from entering or exiting the trench). The trench 100 is designed so that a bottom portion 113 of the trench 100 contains the sea creatures when the water level is at a low level. The openings 105, 106 may thus be spaced above the bottom portion 113 of the trench 100 so that the inlet and outlet flow of seawater is not directly through the sea creatures. For example, the bottom floor 111 of the trench 100 may be six or seven feet below the surface, and the lower edge of the openings 105, 106 may four feet below the surface though other dimensions are envisioned, and may be selected based on the same basis as other dimensions of the trench, noted above. The circulation of the seawater with the gates 101, 102 closed may thus provide no disturbance to the sea creatures. In another embodiment, a turbine can be used to generate electricity by action of the seawater circulating within the trench 100.

The seawater tide outside of the trench will recede in accordance with natural tidal cycles. When the seawater tide level recedes close to the first tide level, for instance, one of the gates 101, 102 on one of the openings 105, 106 may be removed to release a portion of the seawater in the trench to the adjacent sea, thereby flushing the trench 100. This releasing of this portion of the trench seawater allows new seawater to be introduced once the seawater tide level rises again. In one scenario, the gates are closed, the tide rises, and then one gate is opened so that seawater flushes into the trench, usually at a side opposite to the gate that was opened to let the seawater out. In other scenarios, one or both of the gates are left open during a rising tide and then closed until low tide. In one embodiment, the portion of the seawater released may constitute more than 25% of the volume of the trench, and may specifically be between 25%-35% of the volume of the trench.

By using this method of circulating new seawater into the trench and releasing a portion of the seawater from the trench, the seawater in the trench can be recirculated in a simple and cost-effective way. This way the use of pumps and the like can be avoided or reduced. To explain the benefits of the recirculation with natural seawater, an example is provided regarding the growing cycle of a stone crab. After they hatch, stone crab larvae feed on small planktonic animals. Rotifers or brine shrimp (*Artemia* spp.) are examples of live food types used successfully in cultures. Hygiene during the egg and larval phase is critical to success through to post-larvae in the hatchery. Water quality parameters, such as temperature, salinity, pH, oxygen and ammonia, should be maintained at approximately open sea conditions throughout this phase. The fully planktonic zoea larvae grow through 5 stages over 2-3 weeks at 27-28° C. before changing into a megalopa. Using water directly from the tidal trenches assures the highest quality environment in this phase.

FIG. 1 also illustrates that the inlet pipe 107 and the outlet pipe 108 may include screens 103, 104 so that sea creatures, sea life and/or debris outside of the trench 100 are not introduced into the trench 100 when the two gates 101, 102 are removed. The screens 103, 104 also prevent the sea creatures being cultivated within the trench 100 from exiting the trench 100. The screens 103, 104 may be plastic, wood or a metallic material, such as stainless steel. The screens 103, 104 may be mesh or made to be porous (e.g., possess apertures) to allow the seawater to enter or exit the pipes 107, 108.

The trench 100 may include a plurality of panels in the trench 100. The panels may be rectangular frames with mesh or made to be porous (e.g., possess apertures). These panels may be positioned orthogonally to the longitudinal direction of the trench 100 (i.e., the panels extend in the width direction of the trench 100). The panels may be used to separate or segment different areas of the trench 100 to keep the sea creatures compartmentalized. The apertures of each of the panels may be sized to prevent the sea creatures within the trench (100) to move through the apertures, but to allow the seawater flow. These panels can serve an important function in promoting growth of the sea creatures in this aquaculture environment, particularly through the life cycle changes, wherein larger sea creatures may consume smaller ones.

The benefits of using the separation panels in the aquaculture trench 100 can be explained in reference again to the stone crab example. Crowding of stone crab larvae near the end of the post-hatch cycle can lead to heavy losses due to consumption by other creatures, including adult stone crabs. In general, cultivating stone crabs within an aquaculture environment can involve heavy losses of crabs due to this consumption. The panels in the trench 100 thus allow the stone crab density to be more easily controlled. The panels in the trench 100 further allow compartmentalization of the crabs by growing stage. In other words, the larger, more developed crabs can be separated from the smaller, less developed crabs. Crabs can also be separated based on the sex of the crab. As an additional point, crabs grow by moulting. Crabs shed their exoskeleton and expand the new, soft shell by inflating it with water and then harden the new larger shell. During moulting, the crab is vulnerable to attack by hard-shelled crabs. This moult-related intra-species consumption is an important limitation on the density at which crabs can be grown in traditional pond systems. Finally, the crabs may be more efficiently extracted when they are separated by the panels in the trench 100 because a population between two panels can be maintained at roughly the same point in their growing cycles to reduce crowding in one section versus another and to allow extraction of crabs grown to a sufficient size.

The trench 100 may also include a salinity sensor within the trench. The salinity sensor is configured to measure a salinity of the seawater in the trench. The salinity sensor can help inform the operation of the gates 101, 102 to understand how frequently fresh seawater must be introduced and circulated within the trench 100. Salinity is particularly important, for example, for crab larvae and must be very close to the natural salinity of seawater. In one embodiment, the salinity of the trench 100 is maintained within 10 parts per thousand (ppt) to 45 ppt, and may further be between 15 ppt and 25 ppt. Other measures and/or parameters of water quality can also be measured and controlled, such as opacity as a measure of water purity.

System of Harvesting Sea Creatures from a Trench

The trench 100 described above may be utilized in a system for cultivating and harvesting the sea creatures from the trench 100. The discussion of the trench 100 with the inlet gate 101 and outlet gate 102 is not repeated, but is explained fully above. The system for harvesting the sea creatures from this trench 100 further includes a harvesting apparatus 200.

Figure 2A:
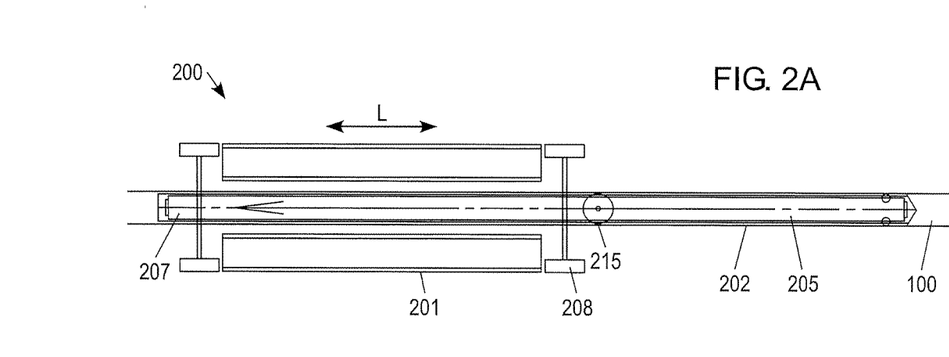
FIG. 2A illustrates a plan view.
Figures 2B, 2C, 2D, 2E:
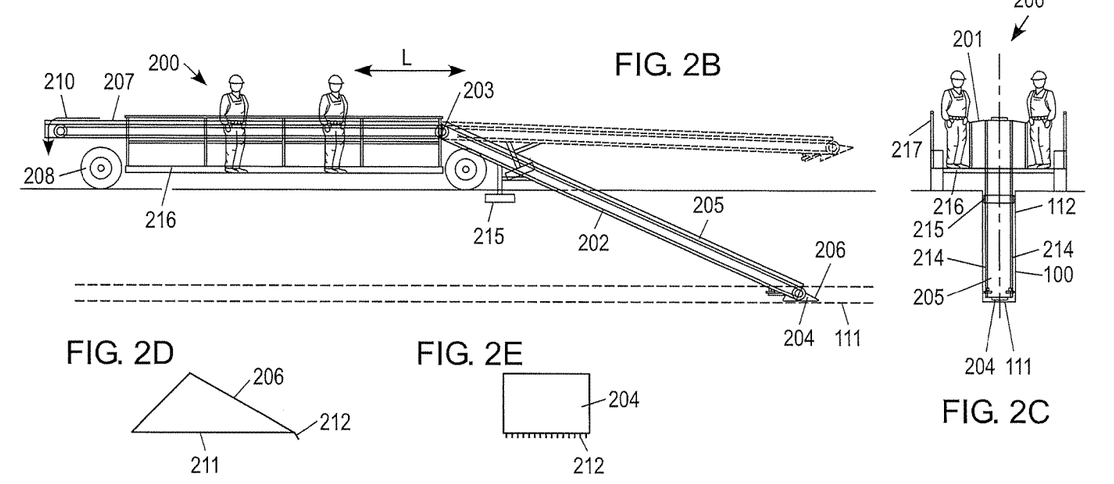
FIG. 2B illustrates an elevation view.
FIG. 2C illustrates a view orthogonal to the longitudinal direction of the trench and harvesting apparatus.
FIG. 2D illustrates an elevation view and FIG. 2E illustrates a view orthogonal to the longitudinal direction of the harvesting apparatus.

FIG. 2A-2C illustrate an embodiment of the harvesting apparatus 200. The harvesting apparatus 200 is configured to extract sea creatures from the trench 100. The harvesting apparatus 200 includes a main body 201 and a rotatable conveyor 202. The main body 201 is positioned above the trench 100 and extends in parallel with the longitudinal direction of the trench 100. The main body 201 is connected to the rotatable conveyor 202, which has a pivot 203 at the end closer to the main body 201. The rotatable conveyor 202 can rotate upwards and downwards about the pivot 203. The rotatable conveyor 202 is positioned directly above the trench 100 before rotating downwards into the trench 100 to extract the sea creatures. In other words, the rotatable conveyor 202 is inclined relative to the walls 112 of the trench 100 when the rotatable conveyor 202 is extracting the sea creatures.

As shown most clearly in FIG. 2A and FIG. 2B, the rotatable conveyor 202 includes a wedge 204 at the opposite end of the rotatable conveyor 202 from the pivot 203. A conveyor belt 205 is positioned between the pivot 203 and the wedge 204 to convey the sea creatures out of the trench 100 as shown in FIG. 2B. The conveyor belt 205 may be of any material that is compatible with seawater (i.e., the conveyor belt 205 will not degrade), and the conveyor belt 205 may be solid or porous with small apertures so that the seawater may pass through the conveyor belt 205. The conveyor belt 205 further may have bristles or projections to help convey the sea creatures up the conveyor.

When the main body 201 of the harvesting apparatus 200 is positioned above the trench 100 and extends in the longitudinal direction "L", the rotatable conveyor may be rotated about the pivot 203 so that the wedge 204 contacts the bottom floor 111 of the trench 100. The wedge 204 possesses an inclined surface 206, which aligns with the conveyor belt 205 when the wedge 204 is on the bottom floor 111 of the trench 100 (i.e., the surface of the inclined surface 206 is parallel with the surface of the conveyor belt 205). The inclined surface 206 of the wedge 204 thus directs the sea creatures in the bottom portion 113 of the trench 100 onto the conveyor belt 205 so that the conveyor belt 205 may convey/carry the sea creatures upwards and out of the trench 100.

In the embodiment shown in FIGS. 2A-2C, the main body 201 of the harvesting apparatus 200 includes a horizontal conveyor 207. As depicted, this horizontal conveyor 207 can form one continuous conveyor with the rotatable conveyor 202. In other words, the same conveyor belt 205 can be the conveyor belt of the horizontal conveyor 207 and the rotatable conveyor 202. In another embodiment, the rotatable conveyor 202 may have a different conveyor belt 205 than the horizontal conveyor 207. The horizontal conveyor 207 extends parallel to the longitudinal direction "L" of the trench 100 and is positioned directly above the trench 207. Sea creatures may thus be conveyed by the rotatable conveyor 202 out of the trench 100 and up onto the horizontal conveyor 207. The sea creatures may be easily removed from the horizontal conveyor 207 by manual or automatic means (described further below).

The main body 201 may include wheels 208 that support the main body 201 on all four sides of the main body 201 outside of the trench 100 as shown in FIG. 2A. The main body 201 may include a chute 210 to deposit the sea creatures that were not removed from the horizontal conveyor 207 back into the trench 100. The chute 210 may simply be the end of the horizontal conveyor 207. Depositing the sea creatures that remain on the horizontal conveyor 207 back in to the trench 100 allows for controlled removal of the sea creatures that are, for example, the target size and the return of the sea creatures that are below the target size. For example, crabs that are large enough for declawing or shipping may be removed from the horizontal conveyor 207, and crabs that are too small for further processing may be dropped back into the trench 100 via the chute 210.

As illustrated in FIG. 2D, in addition to the inclined surface 206 described above, and the wedge 204 also has a bottom surface 211 that is designed to align with the bottom floor 111 of the trench 100. The bottom surface 211 may include wheels or other friction-reducing properties to enable the bottom surface 211 to glide along the bottom floor 111 of the trench 100. In an alternate embodiment, the bottom surface 211 of the wedge 204 may not contact the bottom floor 111 of the trench 100. The wedge 204 may be an aluminum or stainless steel scoop that is configured to contact the sea creatures to direct the sea creatures onto the conveyor belt 205.

FIG. 2E illustrates that an embodiment of the wedge 204 may include resilient projections 212 at the leading edge of the wedge 204 between the inclined surface 206 and the bottom surface 211. These resilient projections 212 may be used to gently contact the sea creatures on the bottom floor 111 of the trench 100 to urge the sea creatures up onto the inclined surface 206 of the wedge and onto the conveyor belt 205. In this manner, the resilient projections 212 may lift the sea creatures to direct the sea creatures onto the conveyor belt 205. The resilient projections 212 may be designed to contact the sea creatures without damaging the sea creatures. The resilient projections 212 may thus be made a plastic material, elastic material, resilient metal, hairs, bristles, fibers or other material that will not damage the sea creatures. The resilient projections 212 may be Teflon® or a similar flexible plastic. One of ordinary skill in the art will recognize that the material, length, configuration, and density of the resilient projections 212 may be varied widely to meet the structural, environmental, topographical or other factors of the site.

In another embodiment, the sea creatures could be directed upwards onto the conveyor belt 205 by using a different type of system. For example, a pneumatic device, hydraulic device, or suction device could be utilized to direct the sea creatures onto the conveyor belt 205.

The harvesting apparatus 200 is movable in the longitudinal direction along the trench 100. When the harvesting apparatus 200 moves forward with the wedge 204 on the bottom floor 111 of the trench 100, the wedge 204 can contact the sea creatures and direct the sea creatures onto the conveyor belt 205. The harvesting apparatus 200 will thus typically will move at a very low rate of speed to avoid damaging the sea creatures with the wedge 204. For example, the harvesting apparatus 200 may move forwards at under 5 mph, but can move at only 1 mph or even slower, to accommodate the workers sorting the sea creatures or based on other criteria. The harvesting apparatus 200 may be movable through a variety of methods. For example, the harvesting apparatus 200 can include a motor to propel the harvesting apparatus 200 or the harvesting apparatus 200 could be self-propelled through a different arrangement. Alternatively, the harvesting apparatus 200 could be pulled by a separate vehicle or apparatus (e.g., pulled behind a tractor).

FIGS. 2A and 2C illustrate that the rotatable conveyor 202 may include guide panels 214. The guide panels 214 may be positioned on either side of the conveyor belt 205. The guide panels 214 funnel the sea creatures back onto the conveyor belt 205. Accordingly, the guide panels 214 may be angled relative to the conveyor belt 205 so that gravity pushes sea creatures that are on the guide panels 214 back on to the conveyor belt 205. The guide panels 214 may be sized to contact and very nearly contact the side walls 112 of the trench 100 when the rotatable conveyor 202 is within the trench 100. Examples of materials for the guide panels include plastic materials, metal materials, or any other materials suitable for these guide panels.

FIGS. 2A-2C show that the harvesting apparatus may also include a guide wheel 215. The guide wheel 215 is positioned underneath the rotatable conveyor 202 so that the guide wheel 215 is within the trench 100 when the rotatable conveyor 202 is rotated downwards. The guide wheel 215 may be positioned in the upper portion of the trench 100 when the wedge 204 contacts the bottom floor 111 of the trench 100. The guide wheel 215 possesses a diameter that is equal to or slightly less than the width of the trench 100. The guide wheel 215 thus ensures that the rotatable conveyor 202 and the wedge 204 are correctly positioned within the trench 100.

The embodiment of the harvesting apparatus shown in FIGS. 2A-2C may also include one or more platforms 216 for operators to stand on. On the outside of the platforms 216 (i.e., along the edges away from the horizontal conveyor 207 of the harvesting apparatus 200), guide rails 217 may be positioned to protect the operators from falling off of the platforms 216. The platforms 216 extend on either side of the trench 100 so that an operator may stand on the platform 216 to remove sea creatures from the horizontal conveyor 207. Although not depicted, the harvesting apparatus 200 may include a canopy or shade screen over the platforms 216 and/or horizontal conveyor 207 to support the operators working on the platforms 216.

The platforms 216 may also include containers (e.g., plastic receptacles or bins) that the operators can deposit the sea creatures or debris into. The containers for the sea creatures can be arranged elsewhere on the harvesting apparatus 200, and can be designated for depositing different types of sea creatures and/or different sizes of sea creatures. The containers allow the harvesting apparatus 200 to efficiently collect the sea creatures for further processing or shipping. Automatic machines and processes can also be used to remove the sea creatures from the horizontal conveyor 207 and to deposit the sea creatures into the containers.

Figure 3A:
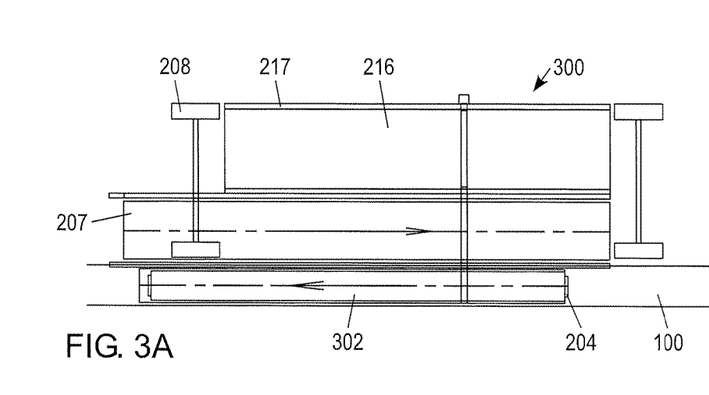
FIGS. 3A-3C are schematics illustrating a second embodiment of the harvesting apparatus for removing sea creatures from the trench.
Figure 3B:
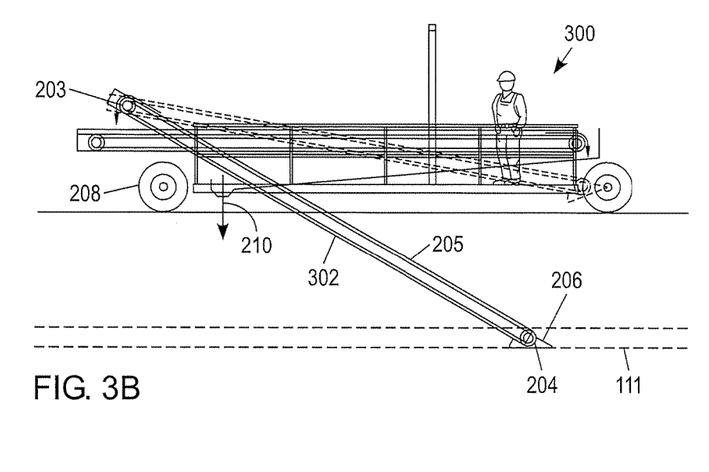
Figure 3C:
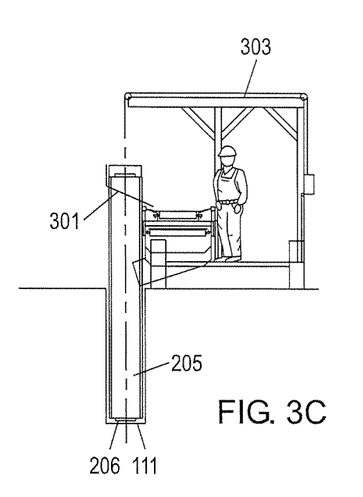

FIGS. 3A-3C illustrate another embodiment of a harvesting machine 300 for harvesting sea creatures from a trench 100. Only the differences with the harvesting machine 200 illustrated in FIGS. 2A-2C are described below.

The harvesting machine 300 includes all four wheels 208 arranged on the same side of the trench 100. The horizontal conveyor 207 of this harvesting machine 300 is not positioned directly over the trench 100 as in the embodiment shown in FIGS. 2A-2C, but instead is directly over the four wheels 208 on the side of the trench 100. In this embodiment, the rotatable conveyor 302 moves upwards and downwards at the pivot 203 instead of simply rotating about the pivot 203 when the rotatable conveyor 302 is moved into and out of the trench 100.

The rotatable conveyor 302 in this embodiment includes a contact rail 301 at the end of the conveyor 202 opposite to the wedge 204. The contact rail 301 pushes the sea creatures from the rotatable conveyor 302 onto the horizontal conveyor 207. The harvesting machine 300 also includes a winch 303 that raises and lowers the rotatable conveyor 302.

Techniques consistent with the present disclosure provide, among other features, systems and methods for maintaining a clean trench environment and harvesting sea creatures from the trench. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for circulating seawater in a trench having sea creatures within the trench, comprising:
   removing a gate from the trench when a seawater level is at a low tide level during a particular day to create an opening in the trench, the opening being positioned above a bottom floor of the trench, the sea creatures being located on the bottom floor of the trench so that the sea creatures are below the opening of the trench, the trench extending in a longitudinal direction;
   circulating the seawater into the trench through the opening when the seawater level rises above the low tide level during the particular day;
   moving the gate to block the opening in the trench when the seawater level rises to a high tide level during the particular day, wherein the high tide level is higher than the low tide level, the moving of the gate preventing the seawater from entering the trench;
   releasing a portion of the seawater in the trench by removing the gate from the opening in the trench after the seawater level recedes to the low tide level during the particular day,
   extracting the sea creatures from the trench with a harvesting apparatus, the extracting of the sea creatures comprising:
      positioning the harvesting apparatus adjacent to and above the trench, the harvesting apparatus comprising a main body and a rotatable conveyor, the main body of the harvesting apparatus extending parallel to the longitudinal direction of the trench and the rotatable conveyor being positioned directly above the trench,
      rotating the rotatable conveyor of the harvesting apparatus downwards into the trench about a pivot at one end of the rotatable conveyor, the rotatable conveyor comprising a wedge at an end opposite to the one end of the rotatable conveyor, the wedge comprising a bottom surface and an inclined surface,
      placing the bottom surface of the wedge directly on the bottom floor of the trench by virtue of the rotating of the rotatable conveyor, the inclined surface of the wedge being aligned with the rotatable conveyor,
      advancing the main body of the harvesting apparatus in the longitudinal direction while the wedge is on the bottom floor of the trench to cause the wedge to advance in the longitudinal direction within the trench, the advancing of the wedge causing the wedge to contact and direct the sea creatures on the bottom floor onto the inclined surface of the wedge and then to the rotatable conveyor, and
      rotating the rotatable conveyor simultaneously with the advancing of the main body of the harvesting apparatus to convey the sea creatures out of the trench on the rotatable conveyor,
   wherein the trench is cut through a natural rock formation,
   wherein the trench comprises trench walls that are natural rock, and
   wherein the wedge comprises resilient projections at a leading edge of the wedge between the bottom surface and the inclined surface, the resilient projections contacting the sea creatures on the bottom floor of the trench during the advancing of the main body of the harvesting apparatus to urge the sea creatures onto the inclined surface of the wedge.

2. The method of claim 1, wherein
the trench possesses a first end and a second end opposite to the first end in a longitudinal direction of the trench,
the gate is a first gate located at the first end, and
a second gate is positioned at the second end, the second gate being removable from the trench to create a second opening.

3. The method of claim 2, wherein
a first pipe is connected to the opening,
a second pipe is connected to the second opening, and
the first pipe and the second pipe each extend away from the trench in the longitudinal direction.

4. The method of claim 2, wherein the circulating of the seawater through the trench is performed by removing the first gate and the second gate.

5. The method of claim 1, wherein the portion of the seawater released from the trench during the releasing step is at least 25% of a volume of the trench.

6. The method of claim 1, wherein the gate is moved to block the opening and removed from the opening by an automated machine.

7. The method of claim 1, wherein
the trench includes a plurality of panels within the trench, the panels positioned orthogonally to the longitudinal direction of the trench, and
each of the plurality of panels comprises apertures to allow the seawater to flow between the panels, the apertures of each of the panels being sized to prevent the sea creatures within the trench to move through the apertures.

8. The method of claim 1, wherein
the trench comprises a screen positioned on the opening,
the seawater circulating through the screen when the gate is removed and the seawater flows into and out of the trench, and
the screen being configured to prevent the sea creatures from leaving the trench.

9. The method of claim 1, wherein
the rotatable conveyor is connected to a horizontal conveyor at the pivot so that the sea creatures are conveyed to the horizontal conveyor by the rotatable conveyor, and
the method further comprises a step of removing the sea creatures from the horizontal conveyor.

10. The method of claim 1, further comprising measuring a salinity of the seawater in the trench using a salinity sensor located in the trench.

11. The method according to claim 1, wherein the another portion of the seawater retained in the trench during the particular day is 25%-35% of the volume of the trench.

12. The method according to claim 1, wherein
the harvesting apparatus comprises a guide wheel positioned underneath the rotatable conveyor,
the guide wheel possesses an outer diameter that is equal to or smaller than a width of the trench, and
the guide wheel is positioned in an upper portion of the trench between the side walls of the trench during the advancing of the main body of the harvesting apparatus to guide a position of the rotatable conveyor and the wedge within the trench.

13. A method for circulating seawater in a trench having sea creatures within the trench, comprising:
removing a gate from the trench when a seawater level is at a low tide level during a particular day to create an opening in the trench, the trench comprising a bottom floor and side walls, the trench being cut through a natural rock formation such that the bottom floor and the side walls of the trench are the natural rock formation, the trench extending in a longitudinal direction;
circulating the seawater into the trench through the opening when the seawater level rises above the low tide level during the particular day;
moving the gate to block the opening in the trench when the seawater level rises to a high tide level during the particular day, wherein the high tide level is higher than the low tide level, the moving of the gate preventing the seawater from entering the trench;
releasing a portion of the seawater in the trench by removing the gate from the opening in the trench after the seawater level recedes to the low tide level during the particular day; and
extracting the sea creatures from the trench with a harvesting apparatus, the extracting of the sea creatures comprising:
positioning the harvesting apparatus adjacent to and above the trench, the harvesting apparatus comprising a main body and a rotatable conveyor, the main body of the harvesting apparatus extending parallel to the longitudinal direction of the trench and the rotatable conveyor being positioned directly above the trench,
rotating the rotatable conveyor of the harvesting apparatus downwards into the trench about a pivot at one end of the rotatable conveyor, the rotatable conveyor comprising a wedge at an end opposite to the one end of the rotatable conveyor, the wedge comprising a bottom surface and an inclined surface,
placing the bottom surface of the wedge directly on the bottom floor of the trench by virtue of the rotating of the rotatable conveyor, the inclined surface of the wedge being aligned with the rotatable conveyor,
advancing the main body of the harvesting apparatus in the longitudinal direction while the wedge is on the bottom floor of the trench to cause the wedge to advance in the longitudinal direction within the trench, the advancing of the wedge causing the wedge to contact and direct the sea creatures on the bottom floor onto the inclined surface of the wedge and then to the rotatable conveyor, and
rotating the rotatable conveyor simultaneously with the advancing of the main body of the harvesting apparatus to convey the sea creatures out of the trench on the rotatable conveyor,
wherein the wedge comprises resilient projections at a leading edge of the wedge between the bottom surface and the inclined surface, the resilient projections contacting the sea creatures on the bottom floor of the trench during the advancing of the main body of the harvesting apparatus to urge the sea creatures onto the inclined surface of the wedge.

14. The method according to claim 13, wherein
the harvesting apparatus comprises a guide wheel positioned underneath the rotatable conveyor,
the guide wheel possesses an outer diameter that is equal to or smaller than a width of the trench, and
the guide wheel is positioned in an upper portion of the trench between the side walls of the trench during the advancing of the main body of the harvesting apparatus to guide a position of the rotatable conveyor and the wedge within the trench.

* * * * *